US010198453B2

(12) United States Patent
Li et al.

(10) Patent No.: US 10,198,453 B2
(45) Date of Patent: Feb. 5, 2019

(54) METHOD, DEVICE, AND MOBILE TERMINAL FOR CLEANING UP TEMPORARY FILES IN A MOBILE TERMINAL

(71) Applicant: SHELL INTERNET (BEIJING) SECURITY TECHNOLOGY CO., LTD., Beijing (CN)

(72) Inventors: Hong Li, Beijing (CN); Hang Wei, Beijing (CN); Dingpan Li, Beijing (CN); Jian Ma, Beijing (CN)

(73) Assignee: SHELL INTERNET (BEIJING) SECURITY TECHNOLOGY CO., LTD., Beijing (CN)

( * ) Notice: Subject to any disclaimer, the term of this patent is extended or adjusted under 35 U.S.C. 154(b) by 297 days.

(21) Appl. No.: 15/106,298

(22) PCT Filed: Aug. 13, 2014

(86) PCT No.: PCT/CN2014/084322
§ 371 (c)(1),
(2) Date: Jun. 19, 2016

(87) PCT Pub. No.: WO2015/090080
PCT Pub. Date: Jun. 25, 2015

(65) Prior Publication Data
US 2016/0350296 A1    Dec. 1, 2016

(30) Foreign Application Priority Data

Dec. 19, 2013  (CN) .......................... 2013 1 0706604

(51) Int. Cl.
*G06F 17/30* (2006.01)
*G06F 9/50* (2006.01)
*G06F 12/0891* (2016.01)

(52) U.S. Cl.
CPC ........ *G06F 17/3015* (2013.01); *G06F 9/5022* (2013.01); *G06F 12/0891* (2013.01)

(58) Field of Classification Search
CPC ..................................................... G06F 17/30
(Continued)

(56) References Cited

U.S. PATENT DOCUMENTS 9,426,145 B2 *    8/2016  Ho ........................... G06F 21/33
2006/0188221 A1 *    8/2006  Lee ......................... H04N 5/782
                                                  386/293
(Continued)

FOREIGN PATENT DOCUMENTS

CN    101795320 A    8/2010
CN    102654872 A    9/2012
(Continued)

OTHER PUBLICATIONS

Translation of the International Search Report and Written Opinion corresponding to International Patent Application No. PCT/CN2014/084322, dated Nov. 19, 2014, 9 pages.
(Continued)

*Primary Examiner* — Kim T Nguyen
(74) *Attorney, Agent, or Firm* — Lathrop Gage LLP

(57) ABSTRACT

The present invention provides a method and an apparatus for clearing temporary files in a mobile terminal and a mobile terminal, the method comprises: receiving a clearing instruction; establishing a writer thread according to the clearing instruction; and controlling the writer thread to write data into a first preset file directory, such that an operating system of the mobile terminal is triggered to clear temporary files in at least one second preset file directory according to a preset cache release rule.

15 Claims, 3 Drawing Sheets

(58) Field of Classification Search
USPC .......................................................... 707/692
See application file for complete search history.

(56) References Cited

U.S. PATENT DOCUMENTS

| | | | |
|---|---|---|---|
| 2010/0077337 A1* | 3/2010 | Yang ....................... G06F 1/266 |
| | | | 715/771 |
| 2011/0047334 A1* | 2/2011 | Eichenberger ...... G06F 11/1405 |
| | | | 711/141 |
| 2011/0047362 A1* | 2/2011 | Eichenberger ........ G06F 9/3851 |
| | | | 712/226 |
| 2013/0198470 A1 | 8/2013 | Horiguchi | |
| 2013/0219173 A1* | 8/2013 | Ho .......................... G06F 21/33 |
| | | | 713/157 |
| 2013/0346705 A1* | 12/2013 | Pyla .................... G06F 12/0804 |
| | | | 711/142 |
| 2015/0032866 A1* | 1/2015 | Johnson ............. G06Q 30/0201 |
| | | | 709/221 |

FOREIGN PATENT DOCUMENTS

| CN | 102902672 A | 1/2013 |
|---|---|---|
| CN | 103677977 A | 3/2014 |

OTHER PUBLICATIONS

Chinese Patent Application No. 201310706604.3 Second Office Action dated Nov. 30, 2016, 7 pages.
Chinese Patent Application No. 201310706604.3 English translation of Second Office Action dated Nov. 30, 2016, 8 pages.

\* cited by examiner

METHOD, DEVICE, AND MOBILE TERMINAL FOR CLEANING UP TEMPORARY FILES IN A MOBILE TERMINAL

CROSS-REFERENCE TO RELATED APPLICATION

The present application is a U.S. national phase application of International Application No. PCT/CN2014/084322, filed with the State Intellectual Property Office of P. R. China on Aug. 13, 2014, which is based upon and claims priority to Chinese Patent Application No. 201310706604.3, filed on Dec. 19, 2013, the entire contents of which are incorporated herein by reference.

TECHNICAL FIELD

The present disclosure generally relates to mobile terminal technologies, and more particularly, to a method and an apparatus for clearing temporary files in a mobile terminal and a mobile terminal.

BACKGROUND

With the development of electronic technologies, mobile terminals become more and more popular, and more and more applications are used in the mobile terminals. Usually, a user will install a plurality of applications in the mobile terminal, thus using different applications to realize different purposes. Therefore, it requires an operating system of the mobile terminal to manage applications effectively. Currently, one of the most important management ways is a management way based on sandboxes, namely, each application has its own sandbox and this sandbox occupies portion of memory spaces of the mobile terminal to store application files, documents, user data and temporary files, etc. In addition, for security reasons, sandboxes across applications are usually not able to access each other.

Therefore, with the management way based on sandboxes, it is not allowed to clear temporary files (memory spaces in the mobile terminal) by the applications, and only the operating system of the mobile terminal has the cleaning authority. Only the operating system of the mobile terminal may clear the temporary files in the sandboxes of portion of the applications automatically to release the memory spaces if the memory spaces are insufficient. Therefore, it is difficult to clear the temporary files of the installed applications in the mobile terminal, resulting in that, the longer the mobile terminal operates, the more the accumulated temporary files are, which does not only occupy valuable memory resources of the mobile terminal, but also slow down the speed of the mobile terminal.

SUMMARY

Embodiments of the present disclosure seek to solve at least one of the problems existing in the related art.

Accordingly, a first objective of the present disclosure is to provide a method for clearing temporary files in a mobile terminal.

A second objective of the present disclosure is to provide an apparatus for clearing temporary files in a mobile terminal.

A third objective of the present disclosure is to provide a mobile terminal.

A fourth objective of the present disclosure is to provide a storage medium.

In order to achieve above objectives, according to a first aspect of embodiments of the present disclosure, there is provided a method for clearing temporary files in a mobile terminal, including: receiving a clearing instruction; establishing a writer thread according to the clearing instruction; and controlling the writer thread to write data into a first preset file directory, such that an operating system of the mobile terminal is triggered to clear temporary files in at least one second preset file directory according to a preset cache release rule.

With the method for clearing temporary files in a mobile terminal according to embodiments of the present disclosure, by establishing a writer thread according to a clearing instruction for writing data into the temporary files, a cleaning mechanism of the operating system of the mobile terminal is used effectively for clearing temporary files of other applications according to a preset cache release rule, thus achieving a purpose of releasing more memory spaces and having a good user experience.

In order to achieve above objectives, according to a second aspect of embodiments of the present disclosure, there is provided an apparatus for clearing temporary files in a mobile terminal, including: a clearing instruction receiving module, configured to receive a clearing instruction; a writer thread establishing module, configured to establish a writer thread according to the clearing instruction; and a controlling module, configured to control the writer thread to write data into a first preset file directory, such that an operating system of the mobile terminal is triggered to clear temporary files in at least one second preset file directory according to a preset cache release rule.

With the apparatus for clearing temporary files in a mobile terminal according to embodiments of the present disclosure, by establishing a writer thread according to a clearing instruction and by controlling the writer thread to write data into the temporary files, a cleaning mechanism of the operating system of the mobile terminal may be used effectively to clear temporary files of other applications according to a preset cache release rule, thus achieving a purpose of releasing more memory spaces and having a good user experience.

In order to achieve above objectives, according to a third aspect of embodiments of the present disclosure, there is provided a mobile terminal, including a housing, a screen, a processor, a memory and a circuit board, in which the screen is arranged on the housing, the circuit board is arranged in an interior space enclosed by the housing, and the processor and the memory are arranged on the circuit board; the memory is configured to store executable program codes; the processor is configured to run a program corresponding to the executable program codes by reading the executable program codes stored in the memory, so as to receive a clearing instruction, establish a writer thread according to the clearing instruction, and control the writer thread to write data into a first preset file directory, such that an operating system of the mobile terminal is triggered to clear temporary files in at least one second preset file directory according to a preset cache release rule.

With the mobile terminal according to embodiments of the present disclosure, by establishing a writer thread according to a clearing instruction and by controlling the writer thread to write data into the temporary files, a cleaning mechanism of the operating system of the mobile terminal may be used effectively to clear temporary files of other applications according to a preset cache release rule, thus achieving a purpose of releasing more memory spaces and having a good user experience.

In order to achieve above objectives, according to a fourth aspect of embodiments of the present disclosure, there is provided a storage medium configured to store an application, in which the application is configured to perform a method for clearing temporary files in a mobile terminal according to the first aspect of embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
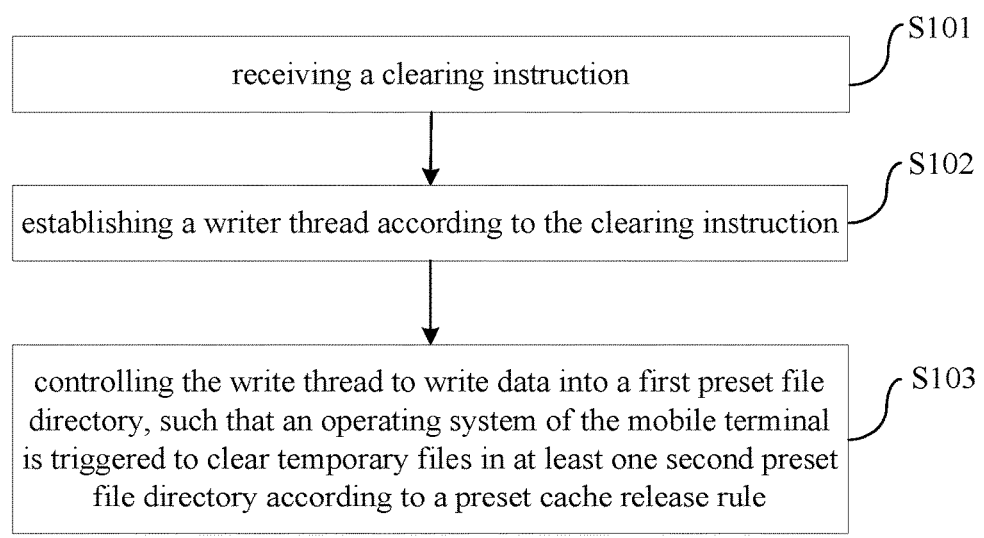
FIG. 1 is a flow chart illustrating a method for clearing temporary files in a mobile terminal according to an embodiment of the present disclosure.

Reference will be made in detail to embodiments of the present disclosure, wherein the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure. On the contrary, alternatives, and modifications can be made in the embodiments without departing from spirit, principles and scope of the present disclosure.

In the description of the present disclosure, terms such as "first" and "second" are used herein for purposes of description and are not intended to indicate or imply relative importance or significance. In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure. In addition, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

A method and an apparatus for clearing temporary files in a mobile terminal and a mobile terminal according to embodiments of the present disclosure will be described with reference to accompanying drawings.

In order to solve the problem that it is difficult to clear temporary files of applications installed in a mobile terminal, which leads to a slow operating speed of the mobile terminal, a method for clearing temporary files in a mobile terminal is provided by the present disclosure.

FIG. 1 is a flow chart illustrating a method for clearing temporary files in a mobile terminal according to an embodiment of the present disclosure. As shown in FIG. 1, the method for clearing temporary files in a mobile terminal includes following steps.

In step 101, a clearing instruction is received.

The clearing instruction may be triggered through a preset way (for example, through a cleaning button), which is variable and will not be elaborated herein.

In an embodiment of the present disclosure, the mobile terminal may be a hardware device having various operating systems, such as a smart phone, a tablet, a personal digital assistant (PDA), and an e-book.

In step 102, a writer thread is established according to the clearing instruction.

Specifically, a thread is a single sequential control flow in a program and may be managed through a process, in which a program being executed in a computer may be called as the "process". In an embodiment of the present disclosure, the writer thread established according to the clearing instruction is a thread which executes writing to a disk.

There may be one or more writer thread. Specifically, after receiving the clearing instruction, a single thread (i.e. a single writing process) or multiple threads (i.e. multiple writing processes) are adopted to write data into a destination folder, such that memory spaces are filled with data, which will be described in detail in following embodiments.

In step 103, the writer thread is controlled to write data into a first preset file directory, such that an operating system of the mobile terminal is triggered to clear temporary files in at least one second preset file directory according to a preset cache release rule.

The preset cache release rule includes releasing a preset number of memory spaces occupied by a background running program. Specifically, the memory spaces may be occupied by controlling the writer thread to write the data continuously, so as to trigger the preset cache release rule in the operating system, thus clearing the temporary files in the at least one second preset file directory in the memory spaces, in which the at least one second preset file directory may be file directories corresponding to other applications, except the first preset file directory.

In an embodiment of the present disclosure, this cleaning process may be realized by an application used for clearing the temporary files. Taking iOS operating system (an operating system developed by Apple Inc. for handheld devices) as an example, according to the principle of the iOS operating system, any temporary file generated in the applications may be stored in library/caches or tmp folder (which is used to store the temporary files, and may have different names in different operating systems) of the applications themselves, and the operating system may allocate the memory spaces according to a size of the data written into library/caches or tmp folder, and this allocated memory spaces may be occupied by the application until this application is released manually or forcibly. When a failure of writing the data into library/caches or tmp folder corresponding to the application is caused by insufficient memory spaces, according to the principle of the iOS operating system, the operating system may clear data in library/caches or tmp folder corresponding to at least one of other applications, so as to release more available memory spaces.

For example, the first preset file directory may be a temporary file directory corresponding to the application used for clearing the temporary files, and the at least one second preset file directory may be file directories corresponding to other applications. The application used for clearing the temporary files is controlled to write the data into the first preset file directory so as to release the temporary files in the at least one second preset file directory.

With the method for clearing temporary files in a mobile terminal according to embodiments in the present disclosure, by establishing a writer thread according to a clearing instruction and by controlling the writer thread to write data into a temporary file directory, a cleaning mechanism of the operating system of the terminal mobile may be used effectively to clear temporary files of other applications according to a preset cache release rule, thus achieving a purpose of releasing more memory spaces and having a good user experience.

Figure 2:
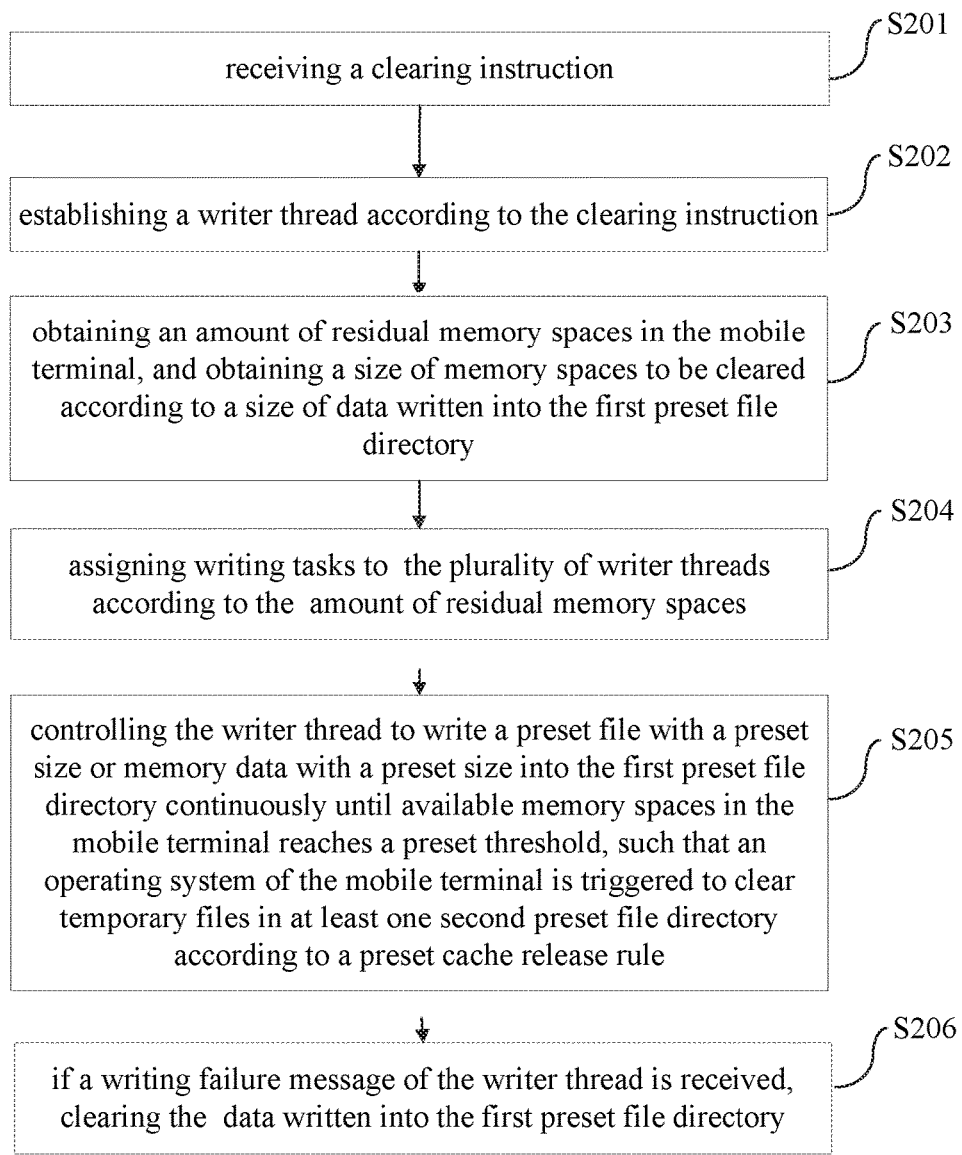
FIG. 2 is a flow chart illustrating a method for clearing temporary files in a mobile terminal according to another embodiment of the present disclosure.

FIG. 2 is a flow chart illustrating a method for clearing temporary files in a mobile terminal according to another embodiment. In order to reach a better cleaning effect, multiple threads may be used to write data repeatedly into the temporary file directory of the application itself until the available memory spaces are insufficient, so as to trigger the preset cache release rule of the operating system. Then, the written data is released. Specifically, as shown in FIG. 2, the method for clearing temporary files in a mobile terminal includes following steps.

In step 201, a clearing instruction is received.

The clearing instruction may be triggered through a preset way (for example, through a cleaning button), which is variable and will not be elaborated herein.

In an embodiment of the present disclosure, the mobile terminal may be a hardware device having any operating system, such as a smart phone, a tablet, a personal digital assistant (PDA), an e-book, etc.

In step 202, a plurality of writer threads are established according to the clearing instruction.

Specifically, after receiving the clearing instruction, the plurality of writer threads may be established according to the clearing instruction, so as to improve an efficiency of writing data into the temporary file directory of the application.

In an embodiment of the present disclosure, the application of the mobile terminal is an application capable of detecting and clearing memory spaces, for example, a temporary file cleaner of the mobile terminal, a mobile phone housekeeper, or any other application capable of detecting and clearing memory spaces.

In step 203, an amount of residual memory spaces in the mobile terminal is obtained, and a size of memory spaces to be cleared is obtained according to a sized of the data written into the first preset file directory.

Specifically, the amount of residual memory spaces in the mobile terminal may be obtained by the application of the mobile terminal via a specific detecting module or an interface provided by the operating system. In embodiments of the present disclosure, a difference between the size of data written into the first preset file directory and the amount of residual memory spaces in the mobile terminal should not be larger than the minimum value of available memory spaces preset by the operating system, such that the cache release rule of the operating system may be triggered after data with the preset size is written into the first preset file directory, thus realizing the purpose of clearing the temporary files corresponding to other applications.

In step 204, writing tasks are assigned to the plurality of writer threads according to the amount of residual memory spaces in the mobile terminal.

Specifically, the residual memory spaces may be allocated to the writing tasks according to a number of the plurality of writer threads and the amount of residual memory spaces in the mobile terminal, in which the plurality of writer threads may write data into the temporary files corresponding to the tasks simultaneously via corresponding interfaces provided by the operating system.

In step 205, the writer threads are controlled to write a preset file or memory data with a preset size into the first preset file directory continuously until a size of available memory spaces in the mobile terminal reaches a preset threshold, such that the operating system of the mobile terminal is triggered to clear temporary files in at least one second preset file directory according to a preset cache release rule.

Specifically, it is determined whether the amount of residual memory spaces is less than the preset threshold, in which the preset threshold may be a preset rate of the memory spaces available to the application to the total memory spaces, and may be set according to a specific operation of the mobile terminal. The preset cache release rule includes releasing the preset number of memory spaces occupied by the background running program. During the operation of the mobile terminal, whenever the preset cache release rule is satisfied, the operating system will release the preset number of memory spaces occupied by the background running program. For example, if the amount of used memory spaces is larger than the preset threshold (for example 90%), an alert is generated in the mobile terminal and a certain amount of memory spaces is released automatically. It should be understood that, the mobile terminal will process the temporary files corresponding to applications not being called first.

It should be noted that, in order to trigger the preset cache release rule in the operating system, it is required to set the size of the preset file or memory data written by the writer threads into the first preset file directory according to the current available memory spaces, so as to ensure that the size of available memory spaces in the mobile terminal reaches the preset threshold in the preset cache release rule, thus triggering the operating system to clear the temporary files.

In an embodiment of the present disclosure, taking iOS operating system as an example, data may be written in following two ways, but the present disclosure is not limited to this.

In the first way, C language file system interfaces are used to write data in the cache into the file system directly. Usually, for each wiring, it is best to write data with a size of 4 KB, this is because, the writing speed will be slowed down if data with too large or too small size is written. C language file system interfaces mainly used are fopen (opening a file), fwrite (writing a data block into a file) and fclose (closing a stream), which may minimize a program running cost generated in the writing process. A statistical result of many experiments shows that the writing speed may be 36

MB/s by this way, i.e. 284 seconds is needed to fill the memory spaces with the size of 10 GB.

In the second way, an Objective-C language (object-oriented programming language and extended C language) file system interface is used to copy a preset data file for many times. A size of the preset data file may be 4 MB. CopyItemAtPath:toPath:error: interface (an application programming interface in the iOS operating system, and used for copying a file into a new path synchronously) in NSFileManager (including methods for querying word library catalogs, creating, renaming and deleting directories, and getting/setting file attributes) is called directly to copy the preset data file for many times until the copying fails, i.e. task spaces have already been filled up. According to experiments, the writing speed may be about 28 MB/s by this way, i.e. 365 seconds is needed to fill the memory spaces with a size of 10 GB.

Based on comparison of the above-described data results, it tends to use the first way in practical use, thus realizing a faster cleaning, the efficiency of which may be improved by 22% when compared to the second way.

In step 206, if a writing failure message of the writer thread is received, the data written into the first preset file directory is cleared.

Specifically, the data written by the writer threads into the first preset file directory continuously occupies the memory spaces of the operating system, and finally the operation system may return two results, one, a successful signal of writing data is returned if the preset cache release rule is not triggered, and the other one, a failure signal of writing data is returned after the preset cache release rule is triggered due to the insufficient memory spaces of the operating system, and the writer thread receiving the failure signal stops running immediately.

In an embodiment of the present disclosure, when all the writer threads complete the writing tasks, the application deletes all temporary files written into the first preset directory file by the writer threads, and then calculates a new amount of residual memory spaces, and compares the new amount of memory spaces with the amount of residual memory spaces obtained before clearing, so as to obtain a result of this cleaning process.

With the method for clearing temporary files in a mobile terminal according to embodiments of the present disclosure, by establishing a plurality of writer threads to improve a writing speed, and by writing data into a temporary file directory continuously to trigger a preset cache release rule, temporary files corresponding to other applications are cleared. Then, by deleting the data written previously, the temporary files of the application itself are cleared, such that memory spaces are released further and a mechanism of the operating system is used effectively, thus improving an efficiency of cleaning temporary files of the applications, having simple operation process, improving an operation fluency of the mobile terminal and enhancing a user experience.

In order to realize the above-described embodiments, embodiments of the present disclosure also provide an apparatus for clearing temporary files in a mobile terminal.

Figure 3:
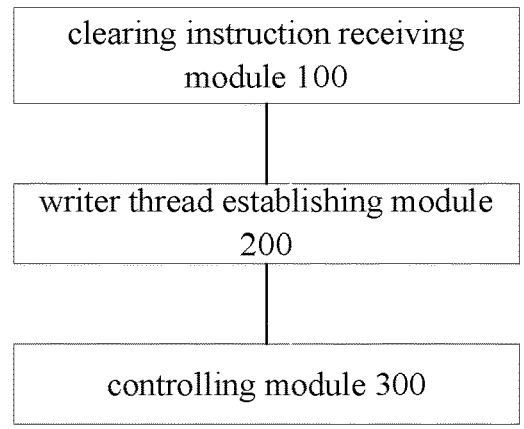
FIG. 3 is a block diagram illustrating an apparatus for clearing temporary files in a mobile terminal according to an embodiment of the present disclosure.

FIG. 3 is a block diagram illustrating an apparatus for clearing temporary files in a mobile terminal according to an embodiment of the preset disclosure.

As shown in FIG. 3, the apparatus for clearing temporary files in a mobile terminal includes a clearing instruction receiving module 100, a writer thread establishing module 200 and a controlling module 300. The mobile terminal in embodiments of the present disclosure may be a hardware device having any operating system, such as a smart phone, a tablet PC, a personal digital assistant (PDA), an e-book, etc.

Specifically, the clearing instruction receiving module 100 is configured to receive a clearing instruction. The clearing instruction may be triggered through a preset way (for example, through a cleaning button), which is variable and will not be elaborated herein.

The writer thread establishing module 200 is configured to establish a writer thread according to the clearing instruction. A thread is a single sequential control flow in a program and may be managed through a process, in which a program being executed in a computer may be called as the "process". In an embodiment of the present disclosure, the writer thread established according to the clearing instruction is a thread which executes writing to a disk. More specifically, there may be one or more writer thread. After receiving the clearing instruction by the clearing instruction receiving module 100, the writer thread establishing module 200 establishes the writer threads, and a single thread (i.e. a single writing process) or multi threads (i.e. multiple writing processes) may be adopted to write data into a destination folder (i.e. the first preset file directory recited in the following embodiments), such that memory spaces are filled with data.

The controlling module 300 is configured to control the writer thread to write data into a first preset file directory such that an operating system of the mobile terminal is triggered to clear temporary files in at least one second preset file directory according to a preset cache release rule. The preset cache release rule includes releasing a preset number of memory spaces occupied by a background running program. More specifically, the controlling module 300 may control the writer thread to write data continuously to occupy the memory spaces, so as to trigger the preset cache release rule in the operating system, thus clearing the temporary files in the at least one second preset file directory in the memory spaces, in which the at least one second preset file directory may be file directories corresponding to other applications, except the first preset file directory.

In an embodiment of the present disclosure, this cleaning process may be realized by an application used for clearing the temporary files. Taking the iOS operating system (an operating system developed by Apple Inc. for handheld devices) as an example, according to the principle of the iOS operating system, any temporary file generated in the applications may be stored in library/caches or tmp folder (which is used to store the temporary files, and may have different names in different operating systems) of the applications themselves, and the operating system may allocate the memory spaces according to a size of the data written into library/caches or tmp folder, and this allocated memory spaces may be occupied by the application until this application is released manually or forcibly. When a failure of writing the data into library/caches or tmp folder corresponding to the application is caused by insufficient memory spaces, according to the principle of the iOS operating system, the operating system may clear data in library/caches or tmp folder corresponding to at least one of other applications so as to release more available memory spaces.

For example, the first preset file directory may be a temporary file directory corresponding to the application used for clearing the temporary files, and the at least one second preset file directory may be file directories corresponding to other applications. The application used for clearing the temporary files is controlled to write the data into the first preset file directory so as to release the temporary files in the at least one second preset file directory.

With the apparatus for clearing temporary files in a mobile terminal according to embodiments in the present disclosure, by establishing a writer thread according to a clearing instruction and by controlling the writer thread to write data into a temporary file directory, a cleaning mechanism of the operating system may be used effectively to clear temporary files of other applications according to a preset cache release rule, thus achieving a purpose of releasing more memory spaces and having a good user experience.

Figure 4:
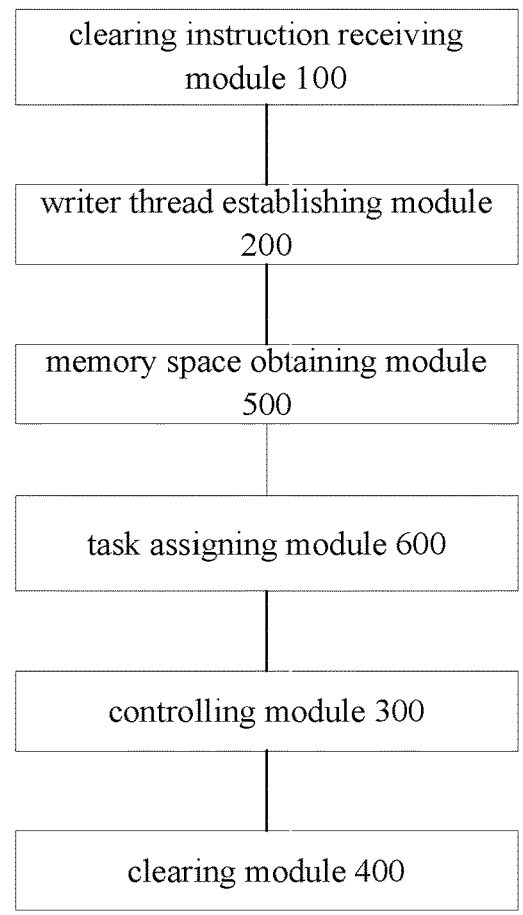
FIG. 4 is a block diagram illustrating an apparatus for clearing temporary files in a mobile terminal according to another embodiment of the present disclosure.

FIG. 4 is a block diagram illustrating an apparatus for clearing temporary files in a mobile terminal according to another embodiment of the preset disclosure.

As shown in FIG. 4, based on the embodiment illustrated in FIG. 3, the apparatus for clearing temporary files in a mobile terminal further includes a clearing module 400, a memory space obtaining module 500 and a task assigning module 600.

The clearing module 400 is configured to clear the data written into the first preset file directory if a writing failure message of the writer thread is received. More specifically, the data written into the first preset file directory by the writer thread continuously occupies the memory spaces of the operating system, and finally the operating system may return two results, one, a successful signal of writing data is returned if the preset cache release rule is not triggered, and the other one, a failure signal of writing data is returned after the preset cache release rule is triggered due to the insufficient memory spaces of the operating system, and the writer thread receiving the failure signal stops running immediately. In an embodiment of the present disclosure, when all the writer threads complete the writing tasks, the clearing module 400 deletes all temporary files written into the first preset directory file by the writer threads, and then calculates a new amount of residual memory spaces, and compares the new amount of residual memory spaces with the amount of residual memory spaces obtained before clearing, so as to obtain a result of this cleaning process.

The controlling module 300 is further configured to control the writer thread to write a preset file with a preset size into the first preset file directory continuously until a size of available memory spaces in the mobile terminal reaches a preset threshold; or configured to control the writer thread to write memory data with a preset size into the first preset file directory continuously until a size of available memory spaces in the mobile terminal reaches a preset threshold. More specifically, the controlling module 300 controls the writer threads to write the preset file with the preset size or the memory data with the preset size into the first preset file directory continuously until the size of available memory spaces in the mobile terminal reaches the preset threshold, so as to trigger the operating system of the mobile terminal to clear the temporary files in the at least one second preset file directory according to the preset cache release rule.

More specifically, the controlling module 300 may determine whether the amount of residual memory spaces is less than the preset threshold, in which the preset threshold may be a preset rate of the memory spaces available to the applications to the total memory spaces, and may be set according to a specific operation of the mobile terminal. The preset cache release rule includes releasing by the operating system the preset number of memory spaces occupied by the background running program. During the operation of the mobile terminal, whenever the preset cache release rule is satisfied, the operating system will release the preset number of memory spaces occupied by the background running program. For example, if the amount of used memory spaces is larger than the preset threshold (for example 90%), an alert is generated in the mobile terminal and a certain amount of memory spaces is released automatically. It should be understood that, the mobile terminal will process the temporary files corresponding to applications not being called first.

It should be noted that, in order to trigger the preset cache release rule in the operating system, it is required to set the size of the preset file or memory data written into the first preset file directory by the writer threads according to the current available memory spaces, so as to ensure that the size of available memory spaces in the mobile terminal reaches the preset threshold in the preset cache release rule, thus triggering the operating system to clear the temporary files.

In an embodiment of the present disclosure, taking iOS operating system as an example, the may be written in following two ways, but the present disclosure is not limited to this.

In the first way, C language file system interfaces are used to write data in the cache into the file system directly. Usually, for each wiring, it is best to write data with a size of 4 KB, this is because, the writing speed will be slowed down if data with too large or two small size is written. C language file system interfaces mainly used are fopen (opening a file), fwrite (writing a data block into a file) and fclose (closing a stream), which may minimize a program running cost generated in the writing process. A statistical result of many experiments shows that the writing speed may be 36 MB/s by this way, i.e. about 284 seconds is needed to fill the memory spaces with a size of 10 GB.

In the second way, an Objective-C language (extended C language, object-oriented programming language) file system interface is used to copy a preset data file for many times. A size of the preset data file may be 4 MB. CopyItemAtPath:toPath:error: interface (an application programming interface in the iOS operating system and used for copying a file into a new path synchronously) in NSFileManager (including methods for querying word library catalogs, creating, renaming and deleting directories, and getting/setting file attributes) is called directly to copy the preset data file for many times until the copying process fails, i.e. task spaces have already been filled up. According to experiments, the writing speed may be about 28 MB/s by this way, i.e. about 365 seconds is needed to fill the memory spaces with a size of 10 GB.

Based on comparison of the above-described data results, it tends to use the first way in practical use, thus realizing a faster cleaning, the performance of which may be improved by 22% when compared to the second way.

The memory space obtaining module 500 is configured to obtain an amount of residual memory spaces in the mobile terminal before the controlling module 300 controls the writer thread to writ data into the first preset file directory continuously, and to obtain a size of memory spaces to be cleared according to a size of the data written into the first preset file directory. More specifically, the memory space obtaining module 500 may obtain the amount of currently residual memory spaces in the mobile terminal. In an embodiment of the present disclosure, a difference between the size of the data written into the first preset file directory and the amount of residual memory spaces in the mobile terminal should not be greater than a minimum amount of residual memory spaces preset by the operating system, such that the preset cache release rule of the operating system can be triggered after the data with the preset size is written into the first preset file directory, thus realizing a purpose of clearing temporary files corresponding to other applications.

The task assigning module 600 is configured to assign writing tasks to the plurality of writer threads according to the amount of residual memory spaces before the controlling module controls the writer thread to write data into the first preset file directory. More specifically, the task assigning module 600 may assign the residual memory spaces to the writing tasks according to a number of the plurality of writer threads and the amount of the residual memory spaces, in which the plurality of writer threads may write data into the temporary files corresponding to the tasks simultaneously via corresponding interfaces provided by the operating system.

With the apparatus for clearing temporary files in a mobile terminal according to embodiments in the present disclosure, by establishing a plurality of writer threads to improve a writing speed, and by writing data into a temporary file directory continuously to trigger a preset cache release rule, temporary files corresponding to other applications are cleared. Then, by deleting the data written previously, the temporary files of the application itself are cleared, such that memory spaces are released further and a mechanism of the operating system is used effectively, thus improving an efficiency of cleaning temporary files of the applications, having simple operation process, improving an operation fluency of the mobile terminal and enhancing a user experience.

In order to realize the above-described embodiments, embodiments of the present disclosure also provide a mobile terminal.

The mobile terminal according to embodiments of the present disclosure includes a housing, a screen, a memory, a circuit board and a processor. The screen is arranged on the housing, the circuit board is arranged in an interior space enclosed by the housing, and the processor and the memory are arranged on the circuit board. The memory is configured to store executable program codes. The processor is configured to run a program corresponding to the executable program codes by reading the executable program codes stored in the memory, so as to execute the following steps.

In step 101', a clearing instruction is received.

The clearing instruction may be triggered through a preset way (for example, through a cleaning button), which is variable and will not be elaborated herein.

In an embodiment of the present disclosure, the mobile terminal may be a hardware device having any operating system, such as a smart phone, a tablet PC, a personal digital assistant (PDA), an e-book, etc.

In step 102', a writer thread is established according to the clearing instruction.

Specifically, a thread is a single sequential control flow in a program and may be managed through a process, in which a program being executed in a computer may be called as the "process". In an embodiment of the present disclosure, the writer thread established according to the clearing instruction is a thread which executes writing to a disk.

There may be one or more writer thread. Specifically, after receiving the clearing instruction by the processor, a single thread (i.e. a single writing process) or multiple threads (i.e. multiple writing processes) are adopted to write data into a destination folder (i.e. a first preset file directory recited in following embodiments), such that memory spaces are filled with data, which will be described in detail in following embodiments.

In step 103', the writer thread is controlled to write data into a first preset file directory, such that an operating system of the mobile terminal is triggered to clear temporary files in at least one second preset file directory according to a preset cache release rule.

The preset cache release rule includes releasing a preset number of memory spaces occupied by a background running program. Specifically, the memory spaces may be occupied by controlling the writer thread to write the data continuously, so as to trigger the preset cache release rule in the operating system, thus clearing the temporary files in the at least one second preset file directory in the memory spaces, in which the at least one second preset file directory may be file directories corresponding to other applications, except the first preset file directory.

In an embodiment of the present disclosure, this cleaning process may be realized by an application used for clearing the temporary files. Taking the iOS operating system (an operating system developed by Apple Inc. for handheld devices) as an example, according to the principle of the iOS operating system, any temporary file generated in the applications may be stored in library/caches or tmp folder (which is used to store the temporary files, and may have different names in different operating systems) of the applications themselves, and the operating system may allocate the memory spaces according to a size of the data written into library/caches or tmp folder, and this allocated memory spaces may be occupied by the application until this application is released manually or forcibly. When a failure of writing the data into library/caches or tmp folder corresponding to the application is caused by insufficient memory spaces, according to the principle of the iOS operating system, the operating system may clear data in library/caches or tmp folder corresponding to at least one of other applications, so as to release more available memory spaces.

For example, the first preset file directory may be a temporary file directory corresponding to the application used for clearing the temporary files, and the at least one second preset file directory may be file directories corresponding to other applications. The application used for clearing the temporary files is controlled to write the data into the first preset file directory so as to release the temporary files in the at least one second preset file directory.

With the mobile terminal according to embodiments of the present disclosure, by establishing a writer thread according to a clearing instruction and by controlling the writer thread to write data into a temporary file directory, a cleaning mechanism of the operating system of the terminal mobile is used effectively to clear temporary files of other applications according to a preset cache release rule, thus achieving a purpose of releasing more memory spaces and having a good user experience.

In another embodiment of the preset disclosure, the processor is configured to execute following steps.

In step 201', a clearing instruction is received.

In step 202', a plurality of writer threads are established according to the clearing instruction.

Specifically, after receiving the clearing instruction, the plurality of writer threads may be established according to the clearing instruction, so as to improve an efficiency of writing data into the temporary file directory of the application.

In an embodiment of the present disclosure, the application of the mobile terminal may be an application capable of detecting and clearing the memory spaces, for example, a temporary file cleaner of the mobile terminal, a mobile phone housekeeper, or any other application capable of detecting and cleaning memory spaces.

In step 203', an amount of residual memory spaces in the mobile terminal is obtained, and a size of memory spaces to be cleared is obtained according to a size of the data written into the first preset file directory.

Specifically, the processor may obtain the amount of memory spaces currently residual in the mobile terminal. In an embodiment of the present disclosure, a difference between the size of data written into the first preset file directory and the amount of residual memory spaces in the mobile terminal should not be larger than a minimum amount of residual memory spaces preset by the operating system, such that the preset cache release rule of the operating system may be triggered after data with the preset size is written into the first preset file directory, thus realizing a purpose of clearing the temporary files corresponding to other applications.

In step 204', writing tasks are assigned to the plurality of writer threads according to the amount of residual memory spaces.

Specifically, the processor may assign the residual memory spaces to the writing tasks according to a number of the plurality of writer threads and the amount of residual memory spaces, in which the plurality of writer threads may write data into the temporary files corresponding to the tasks simultaneously via corresponding interfaces provided by the operating system.

In step 205', the writer threads are controlled to write a preset file with a preset size or memory data with a preset size into the first preset file directory continuously until a size of available memory spaces in the mobile terminal reaches a preset threshold.

Specifically, the processor may first determine whether the amount of residual memory spaces is less than the preset threshold, in which the preset threshold may be a preset rate of the memory spaces available to the applications to the total memory spaces, and may be set according to a specific operation of the mobile terminal. The preset cache release rule includes releasing by the operating system the preset number of memory spaces occupied by the background running program. During the operation of the mobile terminal, whenever the preset cache release rule is satisfied, the operating system will release the preset number of memory spaces occupied by the background running program. For example, if the amount of used memory spaces is larger than a preset threshold (for example 90%), an alert is generated in the mobile terminal and a certain amount of memory spaces is released automatically. It should be understood that, the mobile terminal will give priority to the temporary files corresponding to applications not being called.

It should be noted that, in order to trigger the preset cache release rule in the operating system, it is required to set the size of the preset file or memory data written into the first preset file directory by the writer threads according to the current available memory spaces, so as to ensure that the size of available memory spaces in the mobile terminal reaches the preset threshold in the preset cache release rule, thus triggering the operating system to clear the temporary files.

In step 206', if a writing failure message of the writer thread is received, the data written into the first preset file directory is cleared.

Specifically, the data written into the first preset file directory by the writer threads continuously occupies the memory spaces of the operating system, and finally the operating system will return two results, one, a successful signal of writing data is returned if the preset cache release rule is not triggered, and the other one, a failure signal of writing data is returned after the preset cache release rule is triggered due to the insufficient memory spaces of the operating system, and the writer thread receiving the failure signal stops running immediately.

In an embodiment of the present disclosure, when all the writer threads complete the writing tasks, the application deletes all temporary files written into the first preset directory file by the writer threads, and then calculates a new amount of residual memory spaces, and compares the new amount of residual memory spaces with the amount of residual memory spaces obtained before clearing, so as to obtain a result of this cleaning process.

With the mobile terminal according to embodiments of the present disclosure, by establishing a plurality of writer threads to improve a writing speed, and by writing data into a temporary file directory continuously to trigger a preset cache release rule, temporary files corresponding to other applications are cleared. Then, by deleting the data written previously, the temporary files of the application itself are cleared, such that memory spaces are released further, and a mechanism of the operating system is used effectively, thus improving an efficiency of clearing temporary files in the application, having simple operation process, improving an operation fluency of the mobile terminal and enhancing a user experience.

In order to realize the above-described embodiments, embodiments of the preset disclosure also provide a storage medium. The storage medium is configured to store an application, in which the application is configured to perform a method for clearing temporary files in a mobile terminal according to the above-described embodiments of the present disclosure.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for clearing temporary files in a mobile terminal, comprising:
   receiving a clearing instruction;
   establishing a writer thread according to the clearing instruction; and
   controlling the writer thread to write data into a first preset file directory, such that an operating system of the mobile terminal is triggered to clear temporary files in at least one second preset file directory according to a preset cache release rule;
   wherein controlling the writer thread to write data into a first preset file directory comprises:
      controlling the writer thread to write a preset file with a preset size into the first preset file directory continuously until available memory spaces in the mobile terminal reaches a preset threshold; or
      controlling the writer thread to write memory data with a preset size into the first preset file directory continuously until available memory spaces in the mobile terminal reaches a preset threshold.

2. The method according to claim 1, further comprising:
   if a writing failure message of the writer thread is received, clearing the data written into the first preset file directory.

3. The method according to claim 2, before controlling the writer thread to write data into a first preset file directory, further comprising:
   obtaining an amount of residual memory spaces in the mobile terminal, and obtaining a size of memory spaces to be cleared according to a size of the data written into the first preset file directory.

4. The method according to claim 1, wherein the preset cache release rule comprises releasing a preset number of memory spaces occupied by a background running program.

5. The method according to claim 1, wherein there are a plurality of writer threads, and before controlling the writer thread to write data into a first preset file directory, the method further comprises:
   obtaining an amount of residual memory spaces in the mobile terminal, and assigning writing tasks to the plurality of writer threads according to the amount of residual memory spaces in the mobile terminal.

6. A mobile terminal, comprising: a housing, a screen, a processor, a memory and a circuit board, wherein
   the screen is arranged on the housing, the circuit board is arranged in a space enclosed by the housing, and the processor and the memory are arranged on the circuit board;
   the memory is configured to store executable program codes;
   the processor is configured to run a program corresponding to the executable program codes by reading the executable program codes stored in the memory, so as to:
   receive a clearing instruction;
   establish a writer thread according to the clearing instruction; and
   control the writer thread to write data into a first preset file directory, such that an operating system of the mobile terminal is triggered to clear temporary files in at least one second preset file directory according to a preset cache release rule;
   wherein the processor is further configured to:
      control the writer thread to write a preset file with a preset size into the first preset file directory continuously until available memory spaces in the mobile terminal reaches a preset threshold; or
      control the writer thread to write memory data with a preset size into the first preset file directory continuously until available memory spaces in the mobile terminal reaches a preset threshold.

7. The mobile terminal according to claim 6, wherein the processor is further configured to:
   clear the data written into the first preset file directory, if a writing failure message of the writer thread is received.

8. The mobile terminal according to claim 7, wherein the processor is further configured to:
   obtain an amount of residual memory spaces in the mobile terminal before controlling the writer thread to write data into the first preset file directory continuously, and obtain a size of memory spaces to be cleared according to a size of data written into the first preset file directory.

9. The mobile terminal according to claim 6, wherein the preset cache release rule comprises releasing a preset number of memory spaces occupied by a background running program.

10. The mobile terminal according to claim 6, wherein there are a plurality of writer threads and the processor is further configured to:
    assign writing tasks to the plurality of writer threads according to the amount of residual memory spaces in the mobile terminal before controlling the writer thread to write data into a first preset file directory.

11. A storage medium, configured to store an application, wherein the application is configured to perform a method for clearing temporary files in a mobile terminal when a processor of the mobile terminal executes the application, and the method comprises:
    receiving a clearing instruction;
    establishing a writer thread according to the clearing instruction; and
    controlling the writer thread to write data into a first preset file directory, such that an operating system of the mobile terminal is triggered to clear temporary files in at least one second preset file directory according to a preset cache release rule;
    wherein controlling the writer thread to write data into a first preset file directory comprises
       controlling the writer thread to write a preset file with a preset size into the first preset file directory continuously until available memory spaces in the mobile terminal reaches a preset threshold; or
       controlling the writer thread to write memory data with a preset size into the first preset file directory continuously until available memory spaces in the mobile terminal reaches a preset threshold.

12. The storage medium according to claim 11, wherein the method further comprises:
    if a writing failure message of the writer thread is received, clearing the data written into the first preset file directory.

13. The storage medium according to claim 12, wherein the method further comprises:

obtaining an amount of residual memory spaces in the mobile terminal and obtaining a size of memory spaces to be cleared according to a size of the data written into the first preset file directory before controlling the writer thread to write data into a first preset file directory.

14. The storage medium according to claim 11, wherein the preset cache release rule comprises releasing a preset number of memory spaces occupied by a background running program.

15. The storage medium according to claim 11, wherein the method further comprises:
   establishing a plurality of writer threads according to the clearing instruction; and
   obtaining an amount of residual memory spaces in the mobile terminal and assigning writing tasks to the plurality of writer threads according to the amount of residual memory spaces in the mobile terminal before controlling the writer thread to write data into a first preset file directory.

* * * * *